(12) United States Patent
Newman et al.

(10) Patent No.: US 12,481,030 B2
(45) Date of Patent: Nov. 25, 2025

(54) VALIDATION OF A LIDAR SYSTEM BASED ON AN ASYMMETRIC ILLUMINATION PATTERN

(71) Applicant: GM CRUISE HOLDINGS LLC, San Francisco, CA (US)

(72) Inventors: Kevin Newman, San Bruno, CA (US); Hui Li, San Jose, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1021 days.

(21) Appl. No.: 17/546,784

(22) Filed: Dec. 9, 2021

(65) Prior Publication Data

US 2023/0184900 A1 Jun. 15, 2023

(51) Int. Cl.
 G01S 7/497 (2006.01)
 G01S 7/481 (2006.01)
 G01S 17/931 (2020.01)

(52) U.S. Cl.
 CPC ........... G01S 7/4814 (2013.01); G01S 7/497 (2013.01); G01S 17/931 (2020.01)

(58) Field of Classification Search
 CPC ...... G01S 7/4814; G01S 7/497; G01S 17/931; G01S 17/894; G01S 7/4972; G01S 17/10; G01S 17/42
 See application file for complete search history.

(56) References Cited

U.S. PATENT DOCUMENTS

| | | | | |
|---|---|---|---|---|
| 10,228,654 | B2* | 3/2019 | Christmas | F21S 41/16 |
| 11,636,623 | B2* | 4/2023 | Muhassin | G06T 7/80 |
| | | | | 348/222.1 |
| 12,051,224 | B2* | 7/2024 | Muhassin | G06T 7/80 |
| 2012/0038903 | A1* | 2/2012 | Weimer | G01C 3/08 |
| | | | | 250/208.2 |
| 2018/0143320 | A1* | 5/2018 | Steever | G01S 17/89 |
| 2019/0265338 | A1* | 8/2019 | Lin | G02B 5/10 |
| 2019/0369256 | A1* | 12/2019 | Shotan | G01S 7/4972 |
| 2020/0200904 | A1* | 6/2020 | Singer | B60W 10/04 |
| 2020/0379092 | A1* | 12/2020 | Morarity | G01S 7/484 |
| 2021/0033255 | A1* | 2/2021 | Kuffner, Jr. | G01S 7/4972 |
| 2022/0414931 | A1* | 12/2022 | Muhassin | H04N 23/55 |

* cited by examiner

*Primary Examiner* — Jonathan M Hansen
(74) *Attorney, Agent, or Firm* — CANTOR COLBURN LLP

(57) ABSTRACT

The present technology is directed to validating a lidar system based on an asymmetric illumination pattern. More specifically, the present technology is generally related to determining a positioning error between a laser-based light source and a lens in a lidar system based on the asymmetric illumination pattern. The present technology can project the light source through the lens adjacent to the light source, receive an illumination pattern representing a distribution of light intensity across the field of view, compare the illumination pattern with a set of illumination patterns to determine a matching illumination pattern that is substantially corresponding to the illumination pattern, and determine whether the matching illumination pattern is within a predetermined range of the set of illumination patterns.

20 Claims, 6 Drawing Sheets

VALIDATION OF A LIDAR SYSTEM BASED ON AN ASYMMETRIC ILLUMINATION PATTERN

TECHNICAL FIELD

The subject matter of this disclosure relates in general to the field of LIDAR sensor units, and more particularly, to systems and methods for validating a placement of a lens on a LIDAR sensor unit based on an asymmetric illumination pattern detected by the LIDAR sensor unit.

BACKGROUND

Autonomous vehicles (AVs) have computers and control systems that perform driving and navigation tasks that a human driver conventionally performs. AVs can include a plurality of sensor systems such as a Light Detection and Ranging (LIDAR) system where lidar sensors illuminate the target with laser light and measure the reflected light with a sensor. AVs increasingly include and heavily rely on lidar sensors to aid in vehicular operation and navigation. If sensors are not properly validated, AVs may not detect and/or incorrectly detect object locations, which may create dangerous situations. Therefore, validating these sensors to have accuracy and consistency is important for the safe operation of AVs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1:
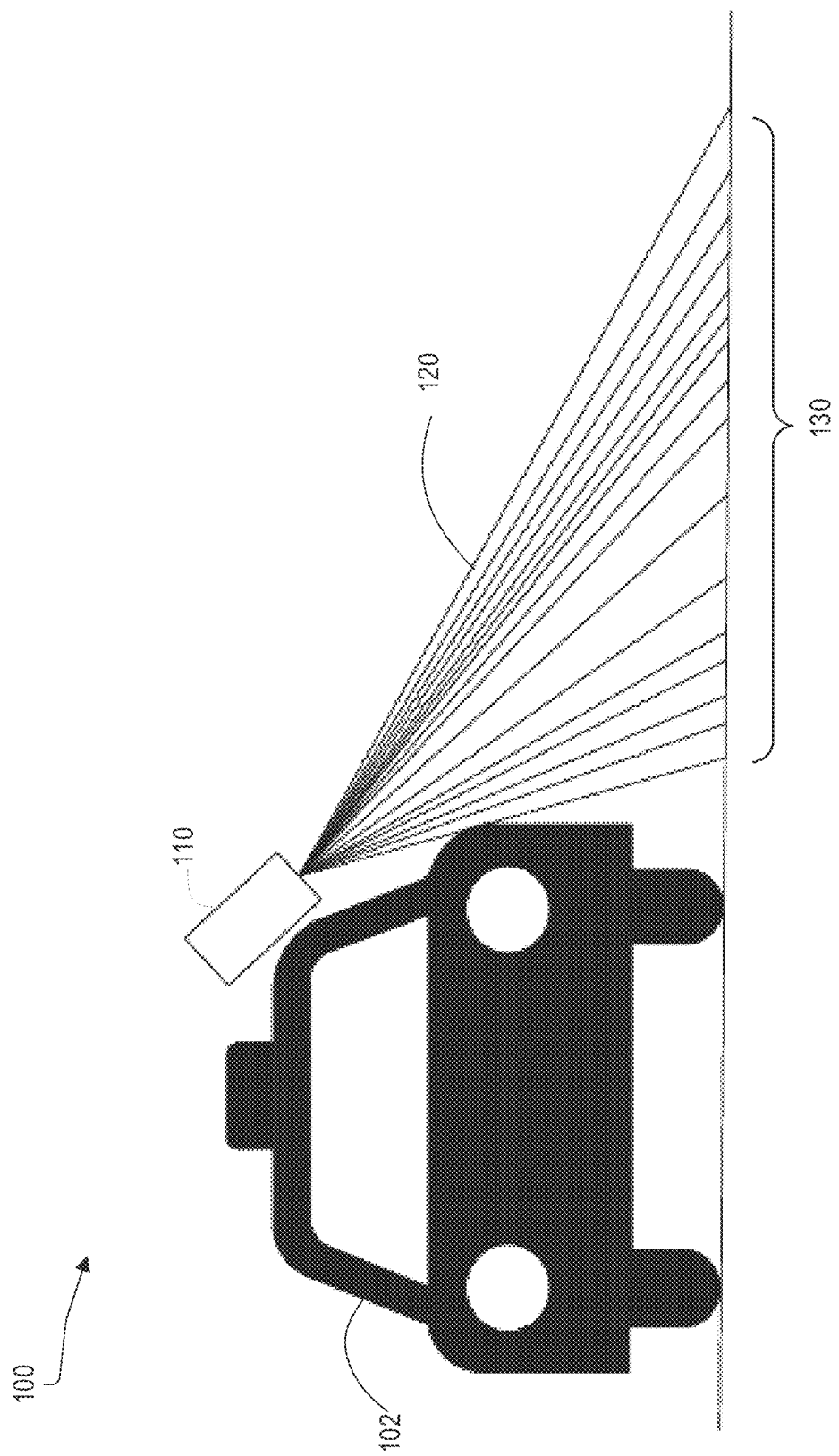
FIG. 1 illustrates an example environment of a lidar system according to some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions, will control.

Additional features and advantages of the disclosure will be set forth in the description which follows, and in part will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Some lidar systems may include a lens or any suitable device to shape or direct laser illumination to produce an illumination pattern with more radiance towards a particular area. For example, the particular area may be the top of an elevation axis within the field of view (FOV) so that the quantity of projected laser illumination can be greater for objects that are farther away and such objects can be better detected. It is crucial, especially in AV technologies where accuracy, consistency, and reliability of data are paramount to the AVs' safe and predictable operation, that the lidar system on vehicles is validated and meets acceptable performance standards. As such, the illumination assembly portion of the lidar system (e.g., laser-based light source and lens) needs to be validated in terms of the positioning between the light source and the lens to ensure the quality and accuracy of the lidar system. Currently, conventional methods for the lidar sensor validation serve mostly on the uniform flat illumination pattern without an angle dependency. Also, no available method or algorithm exists to accommodate the high dynamic intensity scenario where the lens may emit light for the targeted area with a designed correlating angle dependency.

Accordingly, aspects of the present technology address the limitations of conventional lidar validation systems by providing solutions in which the lidar system can be validated based on an illumination pattern. More specifically, the present technology can determine a positioning error between a laser-based light source and a lens in a lidar system.

Various examples of the subject technology are discussed with respect to lidar systems used in vehicles for illustrative purposes. Other examples may relate to other types and uses of lidar systems. These examples may be used in various fields and for various purposes.

DESCRIPTION

FIG. 1 illustrates an example environment 100 of a lidar system according to some aspects of the disclosed technology. More specifically, environment 100 can have a lidar system 110 disposed on a vehicle 102 (e.g., an autonomous vehicle) and configured to scan a field of view (FOV) 130. In some embodiments, the lidar system 110 can be a sparse lidar system.

According to some examples, lidar system 110 (e.g., near-field flash lidar system) can be positioned near a roofline of vehicle 102 and pointed down towards the ground to detect objects in close proximity to vehicle 102. For example, lidar system 110 projects laser illumination 120 with intensity towards the ground, which can be defined by an illumination pattern. The illumination pattern can provide a map of the intensity of laser illumination 120 across the entire FOV 130 of lidar system 110.

Figure 2:
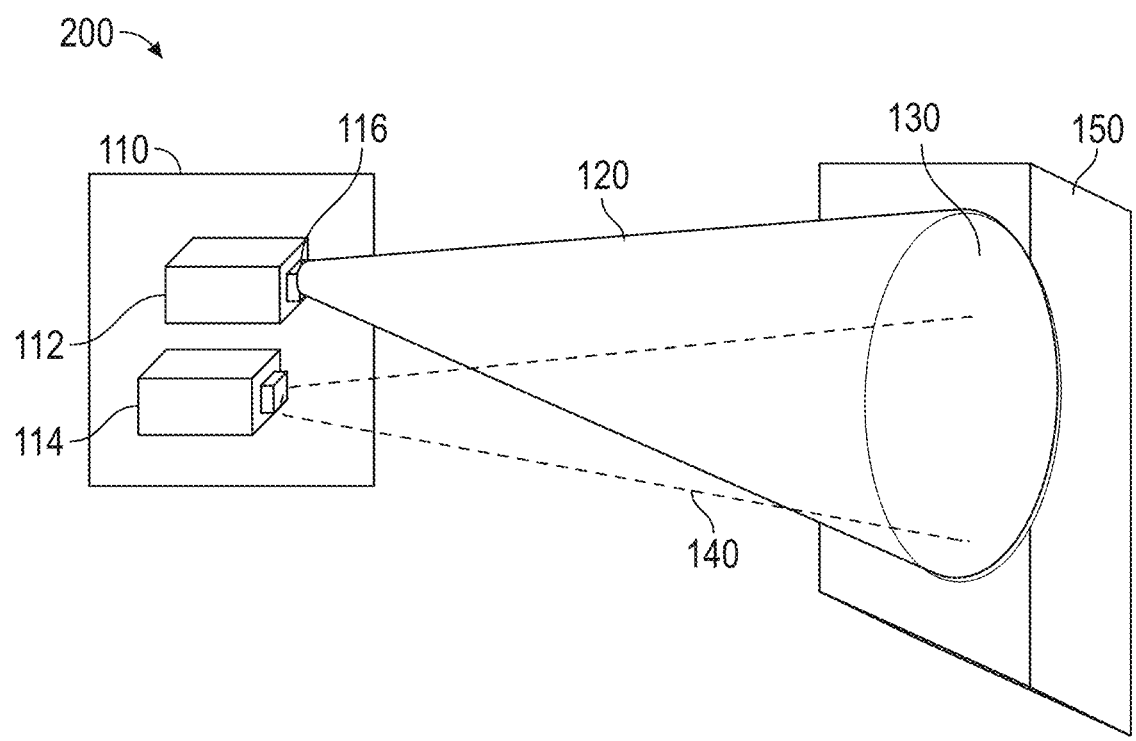
FIG. 2 illustrates an example environment for a lidar validation system according to some aspects of the disclosed technology.

FIG. 2 illustrates an example environment 200 for a lidar validation system according to some aspects of the disclosed technology. As shown in FIG. 2, lidar system 110 (e.g., near-field flash lidar system) can comprise a laser-based light source 112 (i.e., transmitter), a receiver 114, and a lens 116.

According to some examples, laser-based light source 112 can emit the light (i.e., project laser illumination 120) towards a target 150 and illuminate the location of objects within target 150, which can be determined based upon reflected light 140. In some examples, the reflected light 140 can be detected by receiver 114.

In some instances, laser-based light source 112 can be a vertical-cavity surface-emitting laser (VCSEL) or any applicable laser device that emits light with sufficient intensity. In some examples, receiver 114 can be a receiving camera configured to detect the light (e.g., laser illumination 120) emitted by laser-based light source 112. For example, the receiving camera can be configured to detect the reflected light 140, which can provide an illumination pattern that represents the distribution of light intensity across FOV 130.

According to some examples, lidar system 110 can further include a lens 116, which can be configured to redirect laser illumination 120 from laser-based light source 112 to one or more parts of FOV 130 of lidar system 110 and to form the desired illumination pattern. More specifically, lens 116 can be placed adjacent to laser-based light source 112 to diffuse laser illumination 120, thereby increasing FOV 130 to the desired level. In some examples, lens 116 can be an aspheric lens or a free-form lens in a non-spherical shape.

In some examples, lens 116 (e.g., aspheric lens or free-form lens) can be configured to direct laser illumination 120 to form a particular illumination pattern proximate to an autonomous vehicle (e.g., vehicle 102 as illustrated in FIG. 1). For example, the mounting position of lens 116 can steer a portion of laser illumination 120 to a part of FOV 130 of lidar system 110 so that more or less laser illumination 120 can be projected to any desired portion of FOV 130.

In some examples, the position of lens 116 can be adjusted to be in a particular angle of refraction as laser illumination 120 enters or exits lens 116. In some examples, lens 116 can be positioned to direct more laser illumination toward an upper part of FOV 130 of the lidar system as compared to the lower part of FOV 130 so that objects farther away within FOV 130 can be better detected.

Even though environment 200 illustrates lidar system 110 that includes a single lens 116, any applicable number of lens can be implemented in a similar fashion. For example, the number of lens 116 may depend on the number of transmitters (e.g., laser-based light sources).

Figure 3:
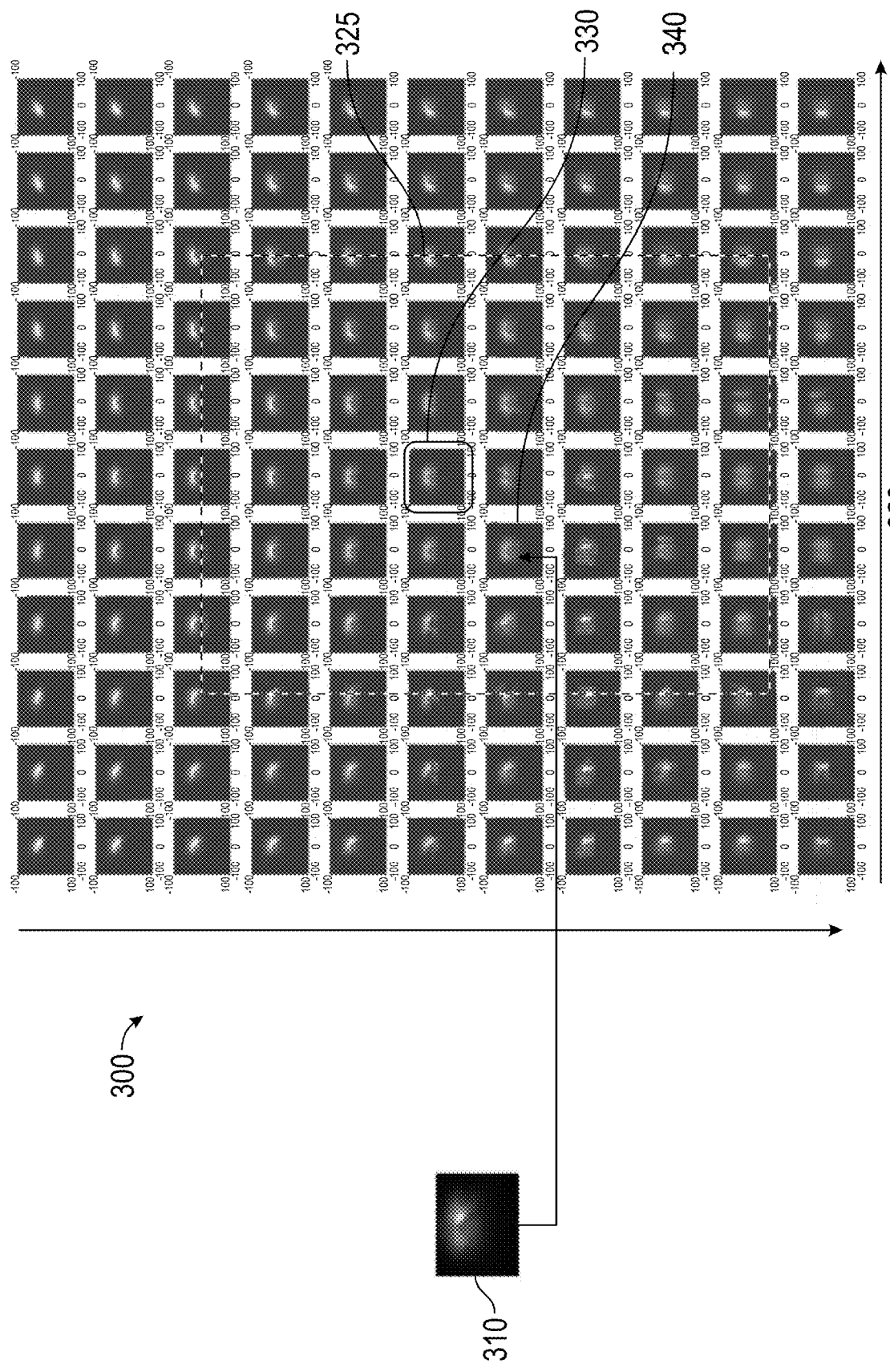
FIG. 3 illustrates an example lidar validation based on an illumination pattern in comparison with a set of illumination patterns according to some aspects of the disclosed technology.

FIG. 3 illustrates an example lidar validation 300 based on an illumination pattern in comparison with a set of illumination patterns according to some aspects of the disclosed technology. According to some examples, a lidar validation system can perform lidar validation 300 based on illumination pattern 310 in comparison with the set of illumination patterns 320.

As previously described in FIG. 2, lidar system 110 can project laser illumination 120 with an intensity, some or all of which can be emitted through lens 116 and be redirected to one or more parts of FOV 130. The reflected light 140 captured by receiver 114 can result in an illumination pattern 310. In some examples, illumination pattern 310 is an image reflecting the intensity of laser illumination 120 across the entire FOV 130 of lidar system 110 and represents a distribution of light intensity across FOV 130, including the redirected laser illumination.

In some examples, lidar system 110 can be validated by a lidar validation system based on illumination pattern 310 in comparison with set of illumination patterns 320 to determine if laser-based light source 112 and lens 116 have any positioning error.

According to some examples, set of illumination patterns 320 (also referred to as a tolerance map) includes a plurality of illumination patterns that are arranged based on various positions of the lens (e.g., lens 116 in FIG. 2) adjacent to the light source (e.g., laser-based light source 112 in FIG. 2). The set of illumination patterns 320 is a reference set of illumination patterns, where each illumination pattern in the reference set illustrates an illumination pattern created by an incremental displacement of the lens relative to any adjacent illumination pattern. The incremental displacement of the lens follows uniform increments along each axis.

In some examples, set of illumination patterns 320 can be represented in a two-dimensional graph or matrix as shown in FIG. 3. For example, set of illumination patterns 320 can comprise a horizontal axis (i.e., x-tolerance) and a vertical axis (i.e., y-tolerance). For example, the horizontal axis (i.e., x-tolerance) can range from −500 µm to 500 µm in 100 µm increments. Also, the vertical axis (i.e., y-tolerance) can range from −500 µm to 500 µm in 100 µm increments.

According to some examples, set of illumination patterns 320 can include an acceptable range 325, where all patterns wholly within the illustrated box labeled 325 are within the acceptable range 325. In some examples, acceptable range 325 can be predetermined based on a photon budget calculation, for example, based on a number of photons of laser illumination that have been sent out and received.

Further, set of illumination patterns 320 can have an optimal illumination pattern 330, which is located at an origin formed by the horizontal and vertical axes. For example, optimal illumination pattern 330 can indicate a perfectly calibrated illumination pattern and be located at an intersection of two axes where x-tolerance equals zero and y-tolerance equals zero.

According to some examples, the lidar validation system can compare illumination pattern 310 with set of illumination patterns 320 to determine any positioning error between the light source (e.g., laser-based light source 112 illustrated in FIG. 2) and lens (e.g., lens 116 illustrated in FIG. 2) of the lidar system. For example, the lidar validation system can determine a matching illumination pattern 340 among set of illumination patterns 320 that substantially corresponds with illumination pattern 310. Since optimal illumination pattern 330 is located at the origin where x-tolerance equals zero and y-tolerance equals zero, a positioning error for illumination pattern 310 can be determined as the horizontal position error (i.e., x-tolerance error) in −100 μm and y-tolerance error in +100 μm. As such, such positioning error can be corrected by repositioning the lens (e.g., lens 116) to the x-position of +100 μm and the y-position of −100 μm.

Figure 4:
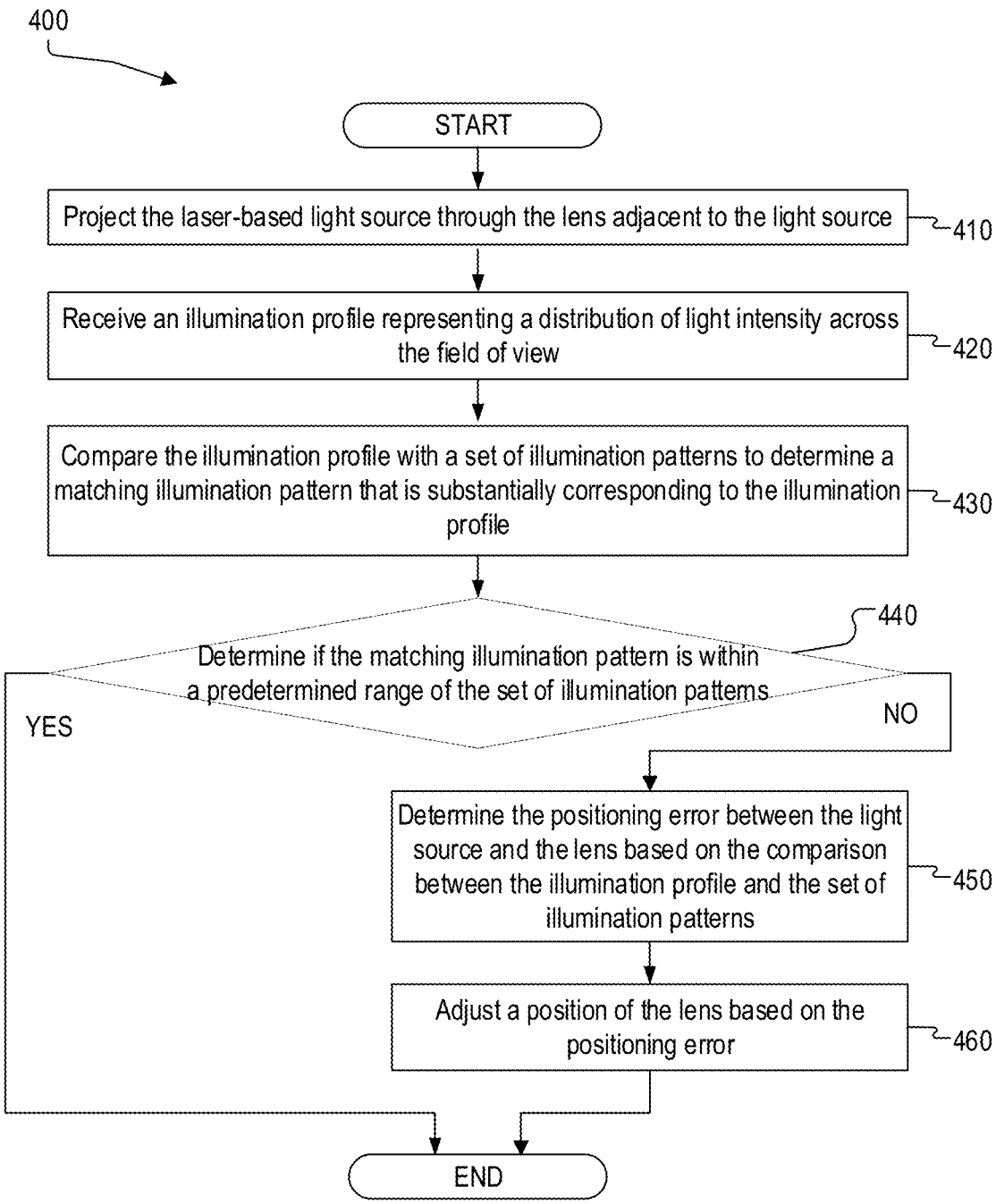
FIG. 4 is a flowchart of a method for validating a lidar system based on an illumination pattern according to some aspects of the disclosed technology.

FIG. 4 illustrates an example method 400 for validating a lidar system based on an illumination pattern, and more specifically, determining a positioning error between a laser-based light source and a lens based on the illumination pattern. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

According to some examples, method 400 includes projecting the laser-based light source through the lens adjacent to the laser-based light source at step 410. For example, the lidar validation system may project laser-based light source 112 through lens 116 adjacent to laser-based light source 112 of lidar system 110 as illustrated in FIG. 2. In some examples, the laser-based light source can be a vertical-cavity surface-emitting laser (VCSEL).

In some examples, the lidar system can be mounted on vehicles (e.g., autonomous vehicles) and configured to scan the FOV. For example, as illustrated in FIG. 1, lidar system 110 can be mounted, for example, near a roofline of vehicle 102 and configured to scan FOV 130 of lidar system 110. In some examples, lidar system 110 is a sparse lidar that is configured to sparsely scan the field of view.

In some examples, the lens can be an aspheric lens or a freeform lens configured to redirect laser illumination from the laser-based light source to form a desired illumination pattern (i.e., optimal illumination pattern). For example, lens 116 as illustrated in FIG. 2 can be an aspheric lens or a free-form lens in a non-spherical shape, which can be configured to diffuse/scatter laser illumination 120 from laser-based light source 112 to form a desired illumination pattern as shown in FIG. 2.

According to some examples, method 400 includes receiving an illumination pattern representing a distribution of light intensity across the FOV at step 420. For example, the lidar validation system may receive an illumination pattern (e.g., illumination pattern 310 as illustrated in FIG. 3) representing a distribution of light intensity across the FOV including the redirected laser illumination.

According to some examples, method 400 includes comparing the illumination pattern with a set of illumination patterns to determine a matching illumination pattern among the set of illumination patterns that is substantially corresponding to the illumination pattern at step 430. For example, with reference to FIG. 3, the lidar validation system may compare illumination pattern 310 with set of illumination patterns 320 to determine a matching illumination pattern 340 that substantially corresponds to illumination pattern 310.

In some examples, the comparison between the illumination pattern with the set of illumination patterns can be based on a manual comparison, especially for a small volume such as up to 1,000. For example, the lidar validation system can manually compare illumination pattern 310 with set of illumination patterns 320 as illustrated in FIG. 3. In some instances, such manual comparison may not involve the conventional measurement method of calculating the mean value and standard deviation.

In some examples, the comparison between the illumination pattern with the set of illumination patterns can be based on machine learning including a pattern fitting and a probability analysis. In some examples, such a method is well suited to a medium volume such as 1,000 to 100,000 samples, though this method is not limited to such a number of samples. For example, the lidar validation system can compare illumination pattern 310 as illustrated in FIG. 3 with set of illumination patterns 320 as illustrated in FIG. 3 by utilizing machine learning such as pattern fitting and probability analysis. More specifically, the pattern fitting can measure how well the machine learning model can generalize to similar data (e.g., a matching illumination pattern 340 among set of illumination patterns 320 that is substantially similar to illumination pattern 310) to that on which it is trained.

In some examples, the comparison between the illumination pattern with the set of illumination patterns can be based on an image correlation with a controlled part-to-part variation for the light source (e.g., laser-based light source 112 illustrated in FIG. 2) and the lens (e.g., lens 116 illustrated in FIG. 2). In some examples, such a method is well suited to a large volume such as 100,000 and up samples or in mass production, though this method is not limited to such a number of samples.

For example, the lidar validation system can compare illumination pattern 310 as illustrated in FIG. 3 with set of illumination patterns 320 as illustrated in FIG. 3 based on the image correlation calculation.

In some examples, an image correlation score matrix can determine the misalignment or discrepancy between illumination pattern 310 and set of illumination patterns 320. For example, illumination pattern 310 can be calculated via image correlation with each pattern of set of illumination patterns 320, and therefore, the image correlation score matrix can be obtained. Based on the image correlation score matrix, the lidar validation system can determine which pattern of set of illumination patterns 320 resembles illumination pattern 310 and further determine the position between the light source and the lens of the lidar system.

In some examples, the part-to-part variation such as lens quality, light source quality, or test correlation (if multiple testers are used) is controllable. In some instances, the light source and lens can have their performance variance or the mechanical tolerance at the assembly connecting feature. If the performance variance is too large, the image correlation score may not be accurate enough to indicate the position between the light source (e.g., laser-based light source 112 illustrated in FIG. 2) and lens (e.g., lens 116 illustrated in FIG. 2) based on set of illumination patterns 320 as illustrated in FIG. 3. As such, if the part-to-part variation can be controlled with a reasonable range, especially in the mass production of samples, more accurate validation can be performed.

As previously described, the set of illumination patterns can be a two-dimensional graph. For example, as shown in FIG. 3, set of illumination patterns 320 can be represented in a two-dimensional matrix where a horizontal axis (i.e., x-tolerance) ranges from −500 μm to 500 μm in 100 μm increments and a vertical axis (i.e., y-tolerance) ranges from −500 μm to 500 μm in 100 μm increments.

In some instances, the set of illumination patterns can be prearranged based on various simulations of positioning the lens adjacent to the light source. For example, set of illumination patterns 320 in FIG. 3 can include a plurality of illumination patterns that are prearranged based on simulations where lens 116 is positioned variously adjacent to laser-based light source 112 of lidar system 110 as illustrated in FIG. 2.

According to some examples, method 400 includes determining whether the matching illumination pattern is within a predetermined range of the set of illumination patterns at step 440. For example, as shown in FIG. 3, the lidar validation system may determine whether matching illumination pattern 340 is within a predetermined range 325 of set of illumination patterns 320.

In some examples, an optimal illumination pattern can be located at an origin formed by a horizontal axis (i.e., x-tolerance) and a vertical axis (i.e., y-tolerance). For example, optimal illumination pattern 330 as illustrated in FIG. 3 (e.g., a perfect calibration illumination pattern) can be located at an intersection of the horizontal axis (i.e., x-tolerance) and the vertical axis (i.e., y-tolerance) where x-tolerance equals zero and y-tolerance equals zero.

In some examples, the predetermined range is based on a photon budget calculation. For example, predetermined range 325 (i.e., acceptable range) can be determined based on the photon budget calculations including one or more parameters such as a number of photons sent out and/or received in light illumination.

According to some examples, method 400 includes if the matching illumination pattern is not within the predetermined range of the set of illumination patterns, determining the positioning error between the light source and the lens based on the comparison between the illumination pattern and the set of illumination patterns at step 450. For example, if matching illumination pattern 340 as illustrated in FIG. 3 is not within predetermined range 325 of set of illumination patterns 320 as shown in FIG. 3, the lidar validation system can determine the positioning error between laser-based light source 112 and lens 116 as illustrated in FIG. 2 based on the comparison between illumination pattern 310 and set of illumination patterns 320 as shown in FIG. 3.

According to some examples, method 400 includes adjusting a position of the lens based on the determined positioning error at step 460. In some instances, based on the matching illumination pattern, the lidar validation system can determine how much of the angle of the lens needs to be moved relative to the laser-based light source. For example, the lidar validation system may adjust a position of lens 116 as illustrated in FIG. 2 based on the positioning error. More specifically, in the example of FIG. 3, matching illumination pattern 340 can be compared with optimal illumination pattern 330 to determine the positioning error such as x-tolerance error in −100 μm and y-tolerance error in +100 μm. Based on the positioning error, lens 116 as illustrated in FIG. 2 can be repositioned by the x-position in +100 μm and the y-position in −100 μm.

According to some examples, instead of or in addition to adjusting the position of the lens, a processing device associated with lidar system 110 can perform an adjustment of the illumination pattern based on a known displacement of the lens relative to the optimal illumination pattern.

Figure 5:
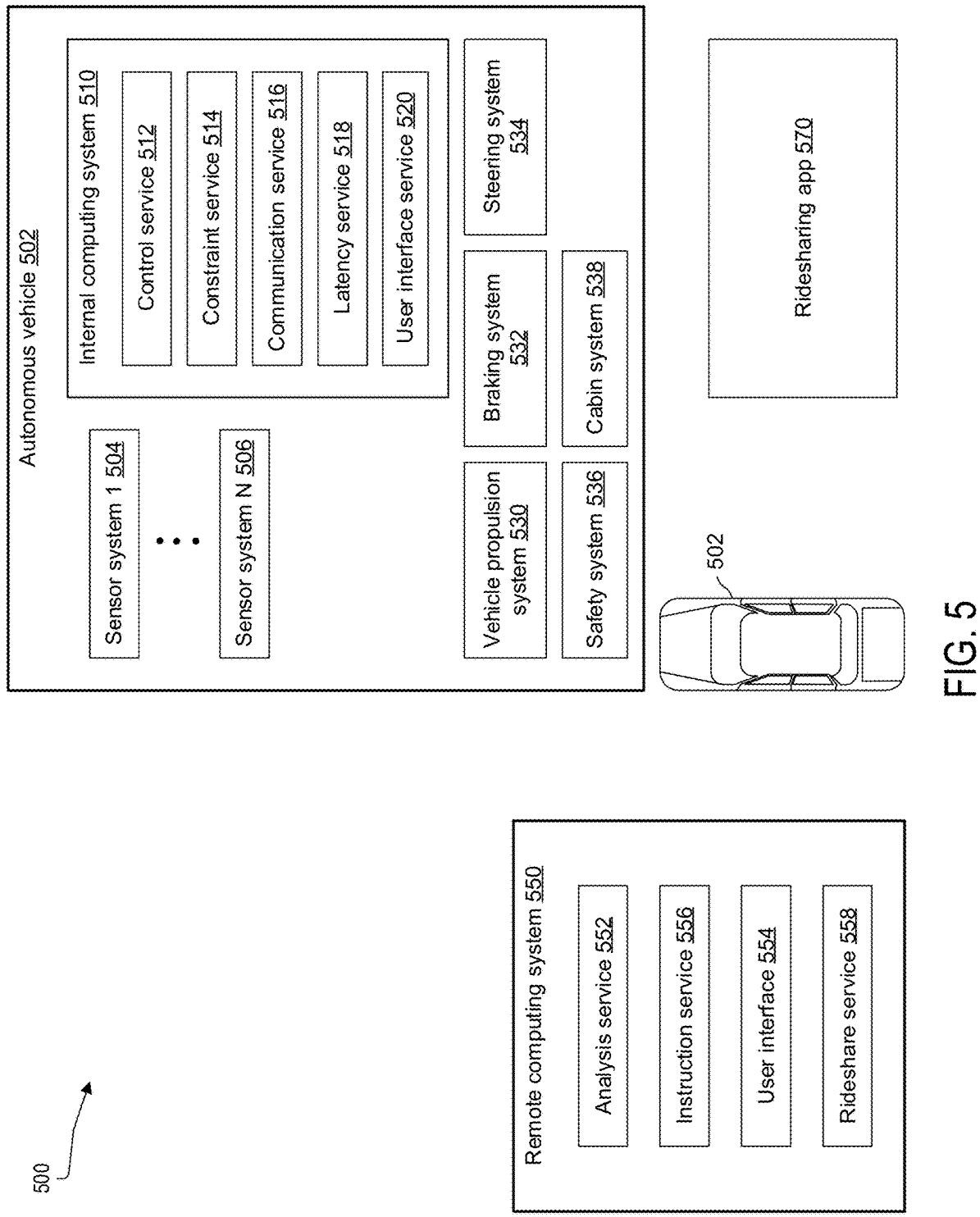
FIG. 5 illustrates an example autonomous vehicle environment including a computing system in communication with an autonomous vehicle, according to some aspects of the disclosed technology.

FIG. 5 illustrates environment 500 that includes an autonomous vehicle 502 in communication with a computing system 550.

The autonomous vehicle 502 can navigate about roadways without a human driver based upon sensor signals output by sensor systems 504-506 of the autonomous vehicle 502. The autonomous vehicle 502 includes a plurality of sensor systems 504-506 (a first sensor system 506 through an Nth sensor system 504). The sensor systems 504-506 are of different types and are arranged about the autonomous vehicle 502. For example, the first sensor system 504 may be a camera sensor system and the Nth sensor system 506 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 502 further includes several mechanical systems that are used to effectuate appropriate motion of the autonomous vehicle 502. For instance, the mechanical systems can include but are not limited to, a vehicle propulsion system 530, a braking system 532, and a steering system 534. The vehicle propulsion system 530 may include an electric motor, an internal combustion engine, or both. The braking system 532 can include an engine brake, brake pads, actuators, and/or any other suitable componentry that is configured to assist in decelerating the autonomous vehicle 502. The steering system 534 includes suitable componentry that is configured to control the direction of movement of the autonomous vehicle 502 during navigation.

The autonomous vehicle 502 further includes a safety system 536 that can include various lights and signal indicators, parking brake, airbags, etc. The autonomous vehicle 502 further includes a cabin system 538 that can include cabin temperature control systems, in-cabin entertainment systems, etc.

The autonomous vehicle 502 additionally comprises an internal computing system 510 that is in communication with the sensor systems 504-506 and the mechanical systems 530, 532, 534. The internal computing system includes at least one processor and at least one memory having computer-executable instructions that are executed by the processor. The computer-executable instructions can make up one or more services responsible for controlling the autonomous vehicle 502, communicating with remote computing system 550, receiving inputs from passengers or human co-pilots, logging metrics regarding data collected by sensor systems 504-506 and human co-pilots, etc.

The internal computing system 510 can include a control service 512 that is configured to control operation of the vehicle propulsion system 530, the braking system 532, the steering system 534, the safety system 536, and the cabin system 538. The control service 512 receives sensor signals from the sensor systems 502-504 as well communicates with other services of the internal computing system 510 to effectuate operation of the autonomous vehicle 502. In some embodiments, control service 512 may carry out operations in concert one or more other systems of autonomous vehicle 502.

The internal computing system 510 can also include a constraint service 514 to facilitate safe propulsion of the autonomous vehicle 502. The constraint service 516 includes instructions for activating a constraint based on a rule-based restriction upon operation of the autonomous vehicle 502. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 512.

The internal computing system 510 can also include a communication service 516. The communication service can include both software and hardware elements for transmitting and receiving signals from/to the remote computing system 550. The communication service 516 is configured to transmit information wirelessly over a network, for example, through an antenna array that provides personal cellular (long-term evolution (LTE), 3G, 5G, etc.) communication.

In some embodiments, one or more services of the internal computing system 510 are configured to send and receive communications to remote computing system 550 for such reasons as reporting data for training and evaluating machine learning algorithms, requesting assistance from remoting computing system or a human operator via remote computing system, software service updates, ridesharing pickup and drop off instructions etc.

The internal computing system 510 can also include a latency service 518. The latency service 518 can utilize timestamps on communications to and from the remote computing system 550 to determine if a communication has been received from the remote computing system 550 in time to be useful. For example, when a service of the internal computing system 510 requests feedback from remote computing system 550 on a time-sensitive process, the latency service 518 can determine if a response was timely received from remote computing system 550 as information can quickly become too stale to be actionable. When the latency service 518 determines that a response has not been received within a threshold, the latency service 518 can enable other systems of autonomous vehicle 502 or a passenger to make necessary decisions or to provide the needed feedback.

The internal computing system 510 can also include a user interface service 520 that can communicate with cabin system 538 in order to provide information or receive information to a human co-pilot or human passenger. In some embodiments, a human co-pilot or human passenger may be required to evaluate and override a constraint from constraint service 514, or the human co-pilot or human passenger may wish to provide an instruction to the autonomous vehicle 502 regarding destinations, requested routes, or other requested operations.

As described above, the remote computing system 550 is configured to send/receive a signal from the autonomous vehicle 502 regarding reporting data for training and evaluating machine learning algorithms, requesting assistance from remoting computing system or a human operator via the remote computing system 550, software service updates, ridesharing pickup and drop off instructions, etc.

The remote computing system 550 includes an analysis service 552 that is configured to receive data from autonomous vehicle 502 and analyze the data to train or evaluate machine learning algorithms for operating the autonomous vehicle 502. The analysis service 552 can also perform analysis pertaining to data associated with one or more errors or constraints reported by autonomous vehicle 502.

The remote computing system 550 can also include a user interface service 554 configured to present metrics, video, pictures, sounds reported from the autonomous vehicle 502 to an operator of remote computing system 550. User interface service 554 can further receive input instructions from an operator that can be sent to the autonomous vehicle 502.

The remote computing system 550 can also include an instruction service 556 for sending instructions regarding the operation of the autonomous vehicle 502. For example, in response to an output of the analysis service 552 or user interface service 554, instructions service 556 can prepare instructions to one or more services of the autonomous vehicle 502 or a co-pilot or passenger of the autonomous vehicle 502.

The remote computing system 550 can also include a rideshare service 558 configured to interact with ridesharing applications 570 operating on (potential) passenger computing devices. The rideshare service 558 can receive requests to be picked up or dropped off from passenger ridesharing app 570 and can dispatch autonomous vehicle 502 for the trip. The rideshare service 558 can also act as an intermediary between the ridesharing app 570 and the autonomous vehicle wherein a passenger might provide instructions to the autonomous vehicle to 502 go around an obstacle, change routes, honk the horn, etc.

Figure 6:
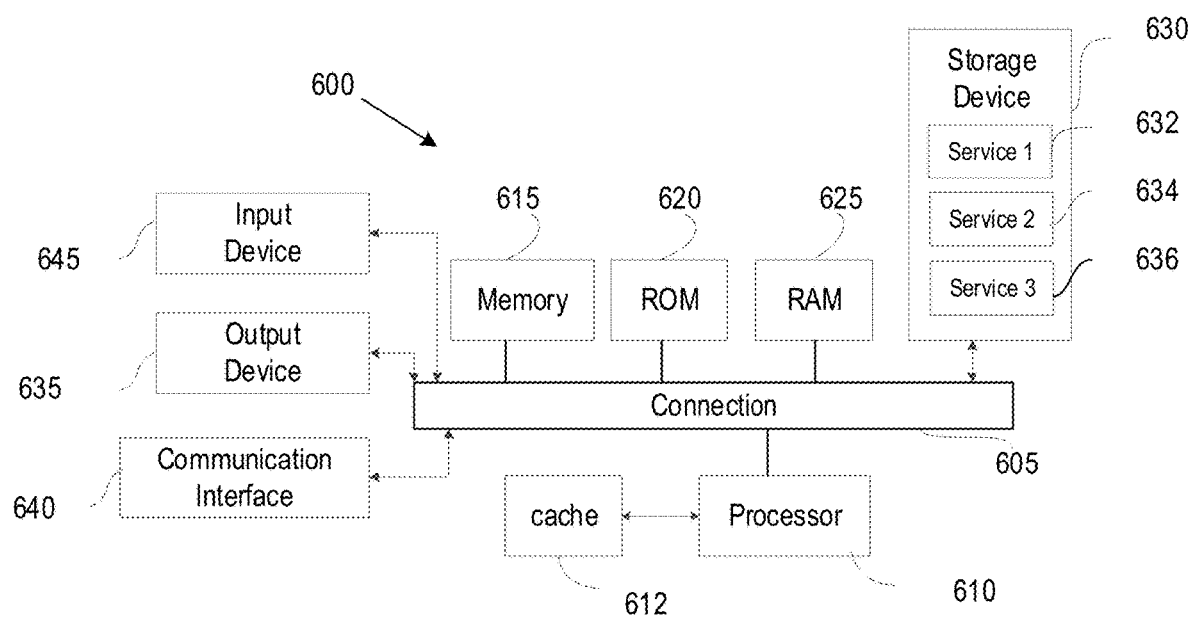
FIG. 6 shows an example of a computing system for implementing some aspects of the present technology.

FIG. 6 shows an example of computing system 600, which can be for example any computing device making up the lidar validation system as described above, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
projecting a laser-based light source through a lens adjacent to the laser-based light source, wherein the laser-based light source and the lens are part of a lidar system and configured to sparsely scan a field of view;
receiving an illumination pattern representing a distribution of light intensity across the field of view;
comparing the received illumination pattern with a set of illumination patterns to determine a matching illumination pattern among the set of illumination patterns that is substantially corresponding to the received illumination pattern;
determining whether the matching illumination pattern is within a predetermined range of the set of illumination patterns; and
adjusting a position of the lens based on a positioning error.

2. The method of claim 1, wherein the comparing the received illumination pattern with the set of illumination patterns is based on a manual comparison.

3. The method of claim 1, wherein the comparing the received illumination pattern with the set of illumination patterns is based on a machine learning including a pattern fitting and a probability analysis.

4. The method of claim 1, wherein the comparing the received illumination pattern with the set of illumination patterns is based on an image correlation with a controlled part-to-part variation.

5. The method of claim 1, further comprising:
if the matching illumination pattern is not within the predetermined range of the set of illumination patterns, determining the positioning error between the laser-based light source and the lens based on the comparison between the received illumination pattern and the set of illumination patterns.

6. The method of claim 1, wherein the lens is an aspheric lens or a free-form lens configured to redirect laser illumination from the laser-based light source.

7. The method of claim 1, wherein the laser-based light source is a vertical-cavity surface-emitting laser (VCSEL).

8. A system for determining a positioning error between a laser-based light source and a lens in a lidar system, comprising:
a storage configured to store instructions; and
a processor configured to execute the instructions and cause the processor to:
project the laser-based light source through the lens adjacent to the laser-based light source, wherein the laser-based light source and the lens are part of the lidar system and configured to sparsely scan a field of view;
receive an illumination pattern representing a distribution of light intensity across the field of view;
compare the received illumination pattern with a set of illumination patterns to determine a matching illumination pattern among the set of illumination patterns that substantially corresponds to the received illumination pattern;
determine whether the matching illumination pattern is within a predetermined range of the set of illumination patterns; and
adjusting a position of the lens based on the positioning error.

9. The system of claim 8, wherein the comparing the received illumination pattern with the set of illumination patterns is based on a manual comparison.

10. The system of claim 8, wherein the comparing the received illumination pattern with the set of illumination patterns is based on a machine learning including a pattern fitting and a probability analysis.

11. The system of claim 8, wherein the comparing the received illumination pattern with the set of illumination patterns is based on an image correlation with a controlled part-to-part variation.

12. The system of claim 8, wherein the processor is configured to execute the instructions and cause the processor to:
if the matching illumination pattern is not within the predetermined range of the set of illumination patterns, determine the positioning error between the laser-based light source and the lens based on the comparison between the received illumination pattern and the set of illumination patterns.

13. The system of claim 8, wherein the lens is an aspheric lens or a free-form lens configured to redirect laser illumination from the laser-based light source.

14. The system of claim 8, wherein the laser-based light source is a vertical-cavity surface-emitting laser (VCSEL).

15. A non-transitory computer readable medium comprising instructions, the instructions, when executed by a computing system, cause the computing system to:
project a laser-based light source through a lens adjacent to the laser-based light source, wherein the laser-based light source and the lens are part of a lidar system and configured to sparsely scan a field of view;
receive an illumination pattern representing a distribution of light intensity across the field of view;
compare the received illumination pattern with a set of illumination patterns to determine a matching illumination pattern among the set of illumination patterns that substantially corresponds to the received illumination pattern;
determine whether the matching illumination pattern is within a predetermined range of the set of illumination patterns based at least in part on a photon budget, wherein the photon budget is determined based on a number of photons of laser illumination that have been sent out and received; and
adjust a position of the lens based on a positioning error.

16. The computer readable medium of claim 15, the comparing the received illumination pattern with the set of illumination patterns is based on a manual comparison.

17. The computer readable medium of claim 15, the comparing the received illumination pattern with the set of illumination patterns is based on a machine learning including a pattern fitting and a probability analysis.

18. The computer readable medium of claim 15, the comparing the received illumination pattern with the set of illumination patterns is based on an image correlation with a controlled part-to-part variation.

19. The computer readable medium of claim 15, wherein the computer readable medium further comprises instructions that, when executed by the computing system, cause the computing system to:

if the matching illumination pattern is not within the predetermined range of the set of illumination patterns, determine the positioning error between the laser-based light source and the lens based on the comparison between the received illumination pattern and the set of illumination patterns.

20. The computer readable medium of claim 15, the lens is an aspheric lens or a free-form lens configured to redirect laser illumination from the laser-based light source.

* * * * *